US012406645B2

(12) United States Patent
Takei et al.

(10) Patent No.: US 12,406,645 B2
(45) Date of Patent: Sep. 2, 2025

(54) AUDIO DEVICE, AUDIO DEVICE PLAYBACK CONTROL METHOD, AND PROGRAM

(71) Applicant: AlphaTheta Corporation, Yokohama (JP)

(72) Inventors: Yoshinori Takei, Yokohama (JP); Hiroyuki Isobe, Yokohama (JP); Nao Takagi, Yokohama (JP); Naruhiro Sato, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 245 days.

(21) Appl. No.: 18/252,111

(22) PCT Filed: Nov. 10, 2020

(86) PCT No.: PCT/JP2020/041920

§ 371 (c)(1),
(2) Date: May 8, 2023

(87) PCT Pub. No.: WO2022/101979

PCT Pub. Date: May 19, 2022

(65) Prior Publication Data

US 2023/0419931 A1 Dec. 28, 2023

(51) Int. Cl.
*H03G 3/00* (2006.01)
*G10H 1/00* (2006.01)
*G10H 1/055* (2006.01)

(52) U.S. Cl.
CPC ........... *G10H 1/0091* (2013.01); *G10H 1/055* (2013.01)

(58) Field of Classification Search
CPC ............................ G10H 1/0091; G10H 1/055
USPC .................................................... 381/61, 119
See application file for complete search history.

(56) References Cited

FOREIGN PATENT DOCUMENTS

| | | | | |
|---|---|---|---|---|
| JP | 2004295969 | A | * | 10/2004 |
| JP | 2015-80110 | A | | 4/2015 |
| JP | 2016-25379 | A | | 2/2016 |
| JP | 2019110035 | A | * | 7/2019 |
| WO | 2019/234861 | A1 | | 12/2019 |
| WO | 2019/239486 | A1 | | 12/2019 |
| WO | 2019/239538 | A1 | | 12/2019 |

OTHER PUBLICATIONS

International Search Report dated Jan. 26, 2021, Application No. PCT/JP2020/041920, 4 pages.
English translation of the International Preliminary Report on Patentability dated May 16, 2023, Application No. PCT/JP2020/041920; 4 pages.

* cited by examiner

*Primary Examiner* — Ammar T Hamid
(74) *Attorney, Agent, or Firm* — Rankin, Hill & Clark LLP

(57) ABSTRACT

Provided is an audio device including: a detector configured to detect a rotational angle of a rotary operation element; a determination unit configured to determine, based on the rotational angle, whether a rotation direction of the rotary operation element is reversed; and an effect playback controller configured to play back an effect sound associated with an angle difference between the rotational angle based on when the rotation direction is reversed and a reference angle.

8 Claims, 5 Drawing Sheets

FIG. 4

| AREA | ANGLE DIFFERENCE | ROTATION DIRECTION BEFORE REVERSAL | |
|---|---|---|---|
| | | CLOCKWISE DIRECTION | COUNTERCLOCKWISE DIRECTION |
| 1 | 0° ~60° | EFFECT SOUND FX1a | EFFECT SOUND FX1b |
| 2 | 91° ~120° | EFFECT SOUND FX2a | EFFECT SOUND FX2b |
| 3 | 121° ~180° | EFFECT SOUND FX3a | EFFECT SOUND FX3b |
| 4 | 181° ~240° | EFFECT SOUND FX4a | EFFECT SOUND FX4b |
| 5 | 241° ~300° | EFFECT SOUND FX5a | EFFECT SOUND FX5b |
| 6 | 301° ~360° | EFFECT SOUND FX6a | EFFECT SOUND FX6b |

AUDIO DEVICE, AUDIO DEVICE PLAYBACK CONTROL METHOD, AND PROGRAM

TECHNICAL FIELD

The invention relates to an audio device, a method of controlling playback of an audio device, and a program.

BACKGROUND ART

Various techniques have been proposed for improving functionality and operability of an audio device such as a controller or a mixer to be used for DJ performances. Examples of such techniques are disclosed, for example, in Patent Literature 1, Patent Literature 2, and Patent Literature 3.

CITATION LIST

Patent Literature(s)

Patent Literature 1: International Publication No. WO 2019/239538
Patent Literature 2: International Publication No. WO 2019/239486
Patent Literature 3: International Publication No. WO 2019/234861

SUMMARY OF THE INVENTION

Problems to be Solved by the Invention

Audio devices are improved in functionality and operability, whereas general users using the audio devices have difficulty in performing user operations, which may impair enjoyment of playing. For example, a scratch playback often used for DJ performances necessitates an accurate and complicated user operation. Specifically, the scratch playback necessitates a high-level skill of accurately performing the following operations in accordance with a music rhythm, for example: a scratch operation of rapidly and repeatedly rotating in a wiggling manner a rotary operation element such as a jog wheel; and an operation of performing switching in a timely manner with use of a cross fader.

It is therefore an object of the invention to provide an audio device, a method of controlling playback of an audio device, and a program which make it possible to perform a scratch playback with a high performance effect by a simple operation even by a user having little experience or knowledge.

Means for Solving the Problems

[1] An audio device including: a detector configured to detect a rotational angle of a rotary operation element; a determination unit configured to determine, based on the rotational angle, whether a rotation direction of the rotary operation element is reversed; and an effect playback controller configured to play back an effect sound associated with an angle difference between the rotational angle based on when the rotation direction is reversed and a reference angle.

[2] The audio device according to [1], in which the rotary operation element has an operation surface provided with a contact sensor, and the reference angle is the rotational angle based on when the contact sensor detects new contact.

[3] The audio device according to [2], in which the effect playback controller plays back the effect sound when the contact sensor detects contact.

[4] The audio device according to any one of [1] to [3], in which the determination unit further determines a rotation direction before reversal of the rotary operation element, and the effect playback controller plays back a different effect sound depending on the angle difference and the rotation direction before the reversal.

[5] The audio device according to any one of [1] to [4], in which the effect sound includes a scratch sound based on forward playback or backward playback of first music.

[6] The audio device according to [5], further including a music playback controller configured to play back second music that is different from the first music, in which the effect playback controller causes the scratch sound to be played back in synchronization with a beat position of the second music.

[7] A method of controlling playback of an audio device, the method including: detecting a rotational angle of a rotary operation element; determining, based on the rotational angle, whether a rotation direction of the rotary operation element is reversed; and playing back an effect sound associated with an angle difference between the rotational angle based on when the rotation direction is reversed and a reference angle.

[8] A program causing a computer to operate as an audio device, the audio device including a detector configured to detect a rotational angle of a rotary operation element, a determination unit configured to determine, based on the rotational angle, whether a rotation direction of the rotary operation element is reversed, and an effect playback controller configured to play back an effect sound associated with an angle difference between the rotational angle based on when the rotation direction is reversed and a reference angle.

According to the above-described configurations, the rotational angle of the rotary operation element is detected, and whether the rotation direction of the rotary operation element is reversed is determined based on the rotational angle. Thereafter, the effect sound associated with the angle difference between the rotational angle based on when the rotation direction is reversed and the reference angle is played back. This makes it possible to perform a scratch playback with a high performance effect by a simple operation even by a user having little experience or knowledge.

BRIEF DESCRIPTION OF DRAWINGS

FIG. 4 is a diagram illustrating an example of effect sounds to be stored in an effect storage unit.

DESCRIPTION OF EMBODIMENT(S)

An exemplary embodiment of the invention will be described below.

Figure 1:
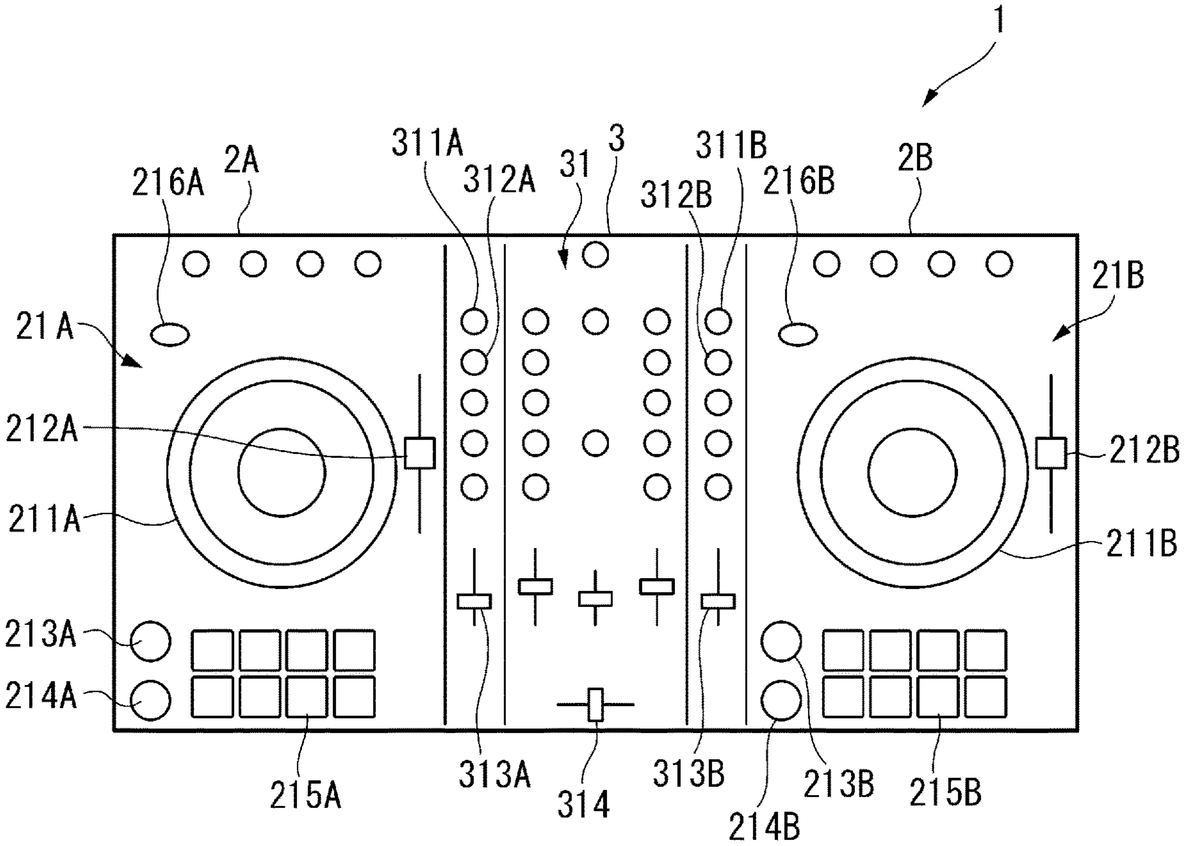
FIG. 1 is a schematic diagram illustrating an audio device according to an exemplary embodiment of the invention.

FIG. 1 is a schematic diagram illustrating an audio device according to an exemplary embodiment of the invention.

An audio device 1 according to the exemplary embodiment is a DJ system in which two players, players 2A and 2B, and a mixer 3 are integrated. The players 2A and 2B play back music. The mixer 3 controls the players 2A and 2B. Specifically, the audio device 1 operates as an audio playback device and an audio playback control device by being operated by a user. The audio device 1 plays back music, and also applies various effects to music being played back and plays back the music to which various effects are applied.

As illustrated in FIG. 1, the audio device 1 includes operation units 21A and 21B that are respectively provided on the players 2A and 2B, and an operation unit 31 provided on the mixer 3.

The operation unit 21A receives a user operation on the player 2A, and the operation unit 21B receives a user operation on the player 2B. The operation unit 31 receives a user operation on the mixer 3.

The operation unit 21A includes a jog wheel 211A, a tempo slider 212A, a cue button 213A, a play/pause button 214A, a performance pad 215A, and a scratch mode button 216A.

The jog wheel 211A operates as a rotary operation element and is a wheel to be used in setting a playback direction and a playback speed of music being played back in the player 2A. The jog wheel 211A has a top surface which is an operation surface provided with a contact sensor $\mathbf{211}S_A$, and detects a contact position where the user touches.

The tempo slider 212A is a lever that adjusts the playback speed of the music being played back in the player 2A.

The cue button 213A is a button to be pressed in setting a predetermined position in music as a cue point.

The play/pause button 214A is a button to be pressed in starting or stopping playback of music in the player 2A.

The performance pad 215A is a versatile operation element to which various functions related to playback control are allocatable.

The scratch mode button 216A is an operation element that is able to receive an on/off switching operation performed by the user, and is used for setting start and end of a scratch mode that achieves a scratch playback of music with a high performance effect by a simple operation. Details of the scratch mode will be described later. The scratch mode button 216A may be a dedicated operation element that is used to set the start and the end of the scratch mode as illustrated in FIG. 1, or may be existing operation elements used in combination.

As with the operation unit 21A, the operation unit 21B includes a jog wheel 211B, a tempo slider 212B, a cue button 213B, a play/pause button 214B, a performance pad 215B, and a scratch mode button 216B. The jog wheel 211B has a top surface which is an operation surface provided with a contact sensor $\mathbf{211}S_B$, and detects a contact position where the user touches.

When the user performs an operation on the operation unit 21A of the player 2A, for example, the audio device 1 plays back music loaded in the player 2A, and also applies an effect to the music being played back and plays back the music to which the effect is applied. The same applies to the player 2B.

The mixer 3 executes switching of music playback between the players 2A and 2B, adjustment of a volume of each channel, and playback of music to which an effect is applied, in response to user operations.

The operation unit 31 of the mixer 3 includes effect selection knobs 311A and 311B, effect amount adjustment knobs 312A and 312B, channel faders 313A and 313B, and a cross fader 314.

The effect selection knobs 311A and 311B are knobs to be used in selecting effects to be applied to pieces of music being played back in the players 2A and 2B, respectively.

The effect amount adjustment knobs 312A and 312B are knobs to be used in adjusting parameters such as depths or magnitudes of effects to be applied to pieces of music being played back in the players 2A and 2B, respectively.

The channel faders 313A and 313B are levers to be used in adjusting output volume levels of pieces of music being played back in the players 2A and 2B, respectively.

The cross fader 314 is a lever to be used in switching output volume levels of pieces of music to be outputted from the players 2A and 2B.

Figure 2:
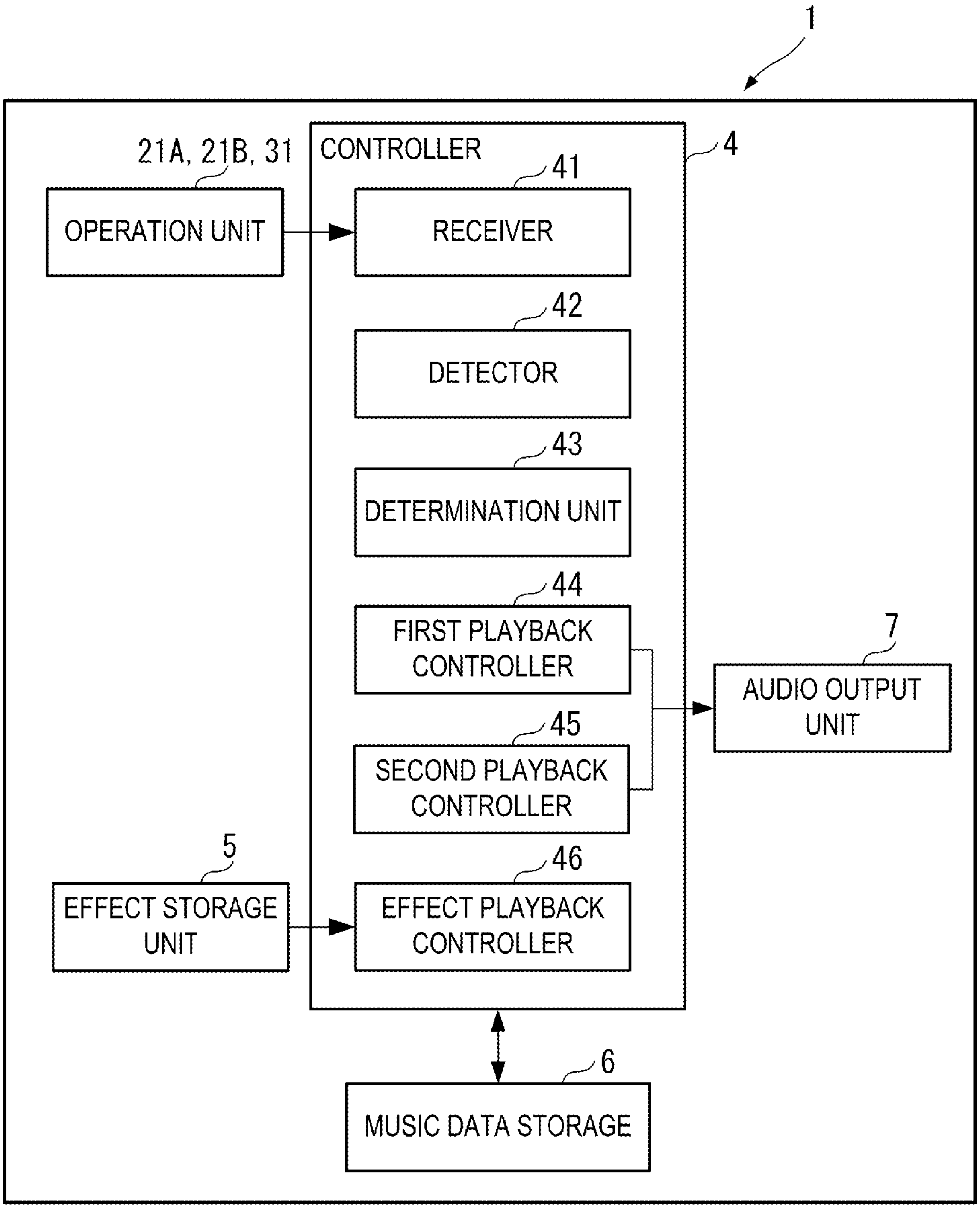
FIG. 2 is a block diagram illustrating a schematic functional configuration of an audio device according to an exemplary embodiment of the invention.

FIG. 2 is a block diagram illustrating a schematic functional configuration of an audio device according to an exemplary embodiment.

As illustrated in FIG. 2, in addition to the above-described components, the audio device 1 includes a controller 4, an effect storage unit 5, a music data storage 6, and an audio output unit 7. Respective functions of the above-described components are achieved by, for example, a processor operating in accordance with a program, in an audio device having a hardware configuration of a computer. Hereinafter, the respective functions of the components will be further described.

The controller 4 is implemented in the audio device 1 by means of, for example, a communication interface, a processor such as a central processing unit (CPU), and a memory to be a work area, and controls operation of the audio device 1. The controller 4 includes a receiver 41, a detector 42, a determination unit 43, a first playback controller 44, a second playback controller 45, and an effect playback controller 46 which are achievable by a processor operating in accordance with a program stored in a memory or received via a communication interface.

The receiver 41 detects a user operation on each of the operation units 21A, 21B and 31, and receives the user operation. Thereafter, the receiver 41 supplies information indicating content of the user operation to each component in the controller 4.

The detector 42 detects respective user operations on the jog wheels 211A and 211B that are the rotary operation elements during execution of the scratch mode.

The determination unit 43 determines whether respective rotation directions of the jog wheels 211A and 211B that are the rotary operation elements have been reversed during the execution of the scratch mode.

The first playback controller 44 plays back music in the player 2A and outputs an audio signal to the audio output unit 7. The second playback controller 45 plays back music in the player 2B and outputs an audio signal to the audio output unit 7. Further, the first playback controller 44 applies an effect to the music being played back in the player 2A, and plays back the music to which the effect is applied. The second playback controller 45 applies an effect to the music being played back in the player 2B, and plays back the music to which the effect is applied.

The effect playback controller 46 plays back, during the execution of the scratch mode, an effect sound associated with an angle difference between a rotational angle and a reference angle. The rotational angle is based on when the rotation direction of the jog wheel 211A or 211B that is the rotary operation element is reversed. It is to be noted that the effect playback controller 46 sets, as the reference angle, the rotational angle based on when the user newly touches the contact sensor 211$S_A$ of the jog wheel 211A or the contact sensor 211$S_B$ of the jog wheel 211B, and plays back a different effect sound depending on the angle difference described above.

The effect storage unit 5 stores correspondence between the angle difference and the effect sound in the scratch mode. More specifically, the effect storage unit 5 stores a parameter and an algorithm for generating the effect sound associated with the angle difference.

The music data storage 6 is configured to store music data by means of, for example, a hard disk drive (HDD) or a flash memory. The music data storage 6 stores music data of multiple pieces of music in a predetermined format such as an MP3 format. In addition to audio information, the music data includes, as tag information: information of BPM, an artwork, a title, a name of an artist, a name of an album, a key, the number of times played by DJ, and a genre, of the music. The music data to be stored in the music data storage 6 is associated with a time stamp which is information of a playback position.

The audio device 1 may include a communication interface, may acquire music data stored in, for example, an external storage device and a computer, via an unillustrated communication interface, and may store the music data in the music data storage 6. In this case, the audio device 1 does not include the music data storage 6, and the external storage device operates as the music data storage 6.

The audio output unit 7 includes, for example, a speaker and a headphone terminal. The audio output unit 7 outputs, as the audio information, the respective audio signals played back by the first playback controller 44, the second playback controller 45, and the effect playback controller 46.

A description is given of an operation of the controller 4 during the execution of the scratch mode in the audio device 1. As described above, the scratch mode is a mode in which the scratch playback with a high performance effect is performed by a simple operation.

In performing the scratch playback, repetitive playback utilizing the respective rotating operations of the jog wheel 211A and 211B and intentional muting utilizing the cross fader 314 have been combined accurately in a timely manner. Thus, the scratch playback with high performance effect has been performed. However, such an operation necessitates knowledge or experience, and an accurate and complicated user operation. In the scratch mode according to the exemplary embodiment, the scratch playback is performed in accordance with a simple user operation on the jog wheels 211A and 211B.

Figure 3:
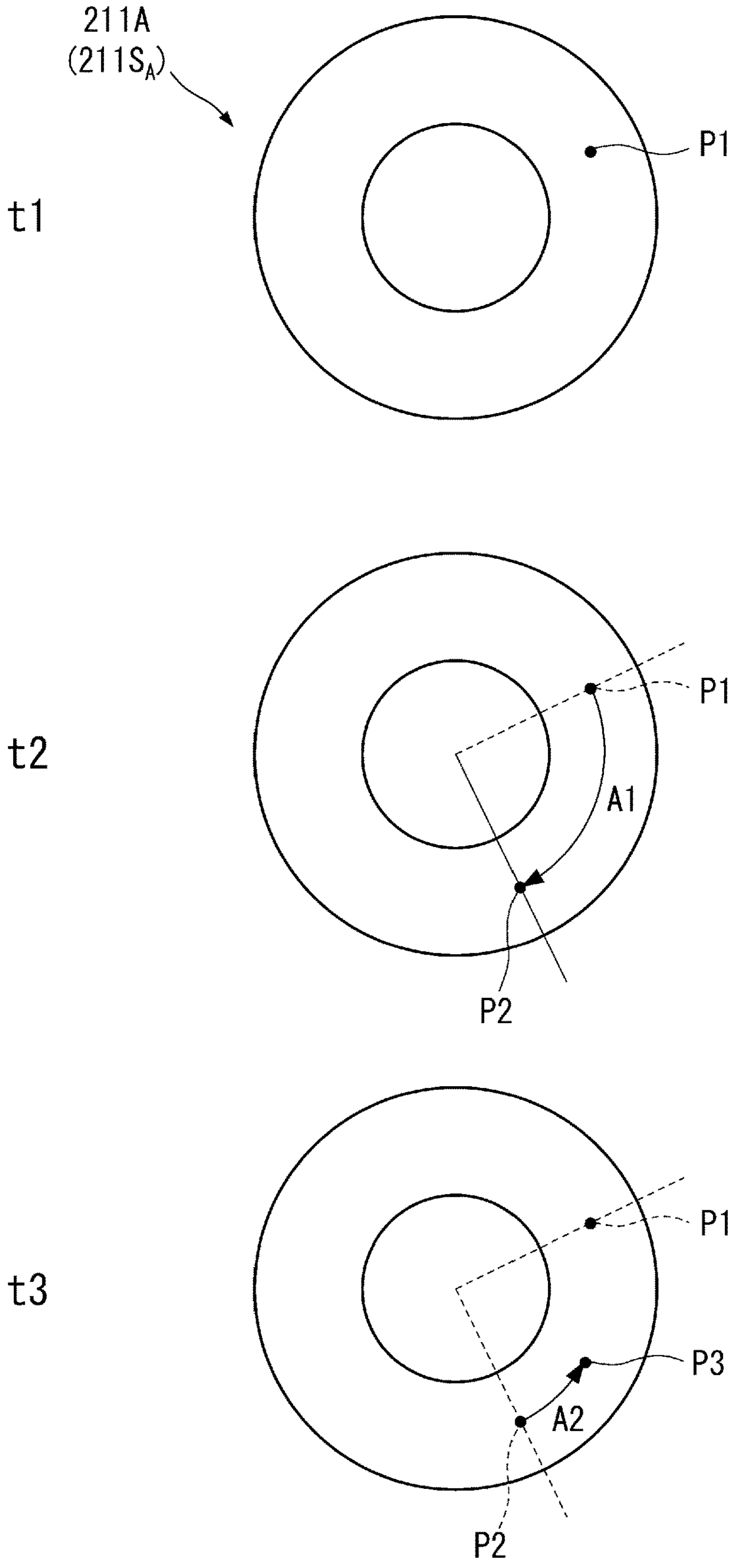
FIG. 3 is a schematic diagram illustrating a scratch mode according to an exemplary embodiment of the invention.

FIG. 3 is a schematic diagram illustrating a process during execution of a scratch mode according to an exemplary embodiment. In the following, a case will be described as an example where the player 2A and 2B are respectively loaded with first music and second music, and, in this state, the scratch playback is performed with use of the player 2A while the player 2B plays back the second music based on audio data. The scratch playback by the player 2A is performed in a case where, for example, a scratch sound that is an effect sound is added in an effect sound manner to the second music being played back by the player 2B. The scratch mode is started and ended with use of the scratch mode button 216A of the operation unit 21A, as described above.

A case is considered in which: during the playback of the second music in the player 2B, the scratch mode button 216A is turned on to start the scratch mode; as illustrated in FIG. 3, a rotating operation on the jog wheel 211A is performed from when the user touches a point P1 of the contact sensor 211$S_A$ of the jog wheel 211A at time t1 until the user moves the point P1 to a point P2 along an arrow A1 between time t1 and time t2; and, as illustrated in FIG. 3, a rotating operation on the jog wheel 211A is performed in a reversed rotation direction until the user moves the point P2 to a point P3 along an arrow A2 between time t2 and time t3.

The detector 42 sequentially detects the rotational angle corresponding to the point P1 at time t1, the rotation direction corresponding to the arrow A1 between time t1 and time t2, the rotational angle corresponding to the point P2 at time t2, and the rotation direction corresponding to the arrow A2 between time t2 and time t3.

The determination unit 43 determines that the rotation direction of the jog wheel 211A is reversed based on the rotation direction between time t1 and time t2 and the rotation direction between time t2 and the t3.

The effect playback controller 46 sets the rotational angle corresponding to the point P1 at time t1 as the reference angle, and selects, by referring to the effect storage unit 5, the effect sound associated with the angle difference between the rotational angle corresponding to the point P2 at time t2 and the reference angle. Thereafter, the effect playback controller 46 generates the selected effect sound and outputs the generated effect sound to the audio output unit 7.

FIG. 4 is a diagram illustrating an example of effect sounds stored in the effect storage unit 5. As illustrated in FIG. 4, the effect storage unit 5 stores each of effect sounds FX1*a* to FX6*a* and FX1*b* to FX6*b* that are different from each other in association with the above-described angle difference and the above-described rotation direction before the reversal. A case where the rotation direction before the reversal is a clockwise direction corresponds to a case where the rotation direction of the jog wheel 211A is reversed from the clockwise direction to a counterclockwise direction. A case where the rotation direction before the reversal is the counterclockwise direction corresponds to a case where the rotation direction of the jog wheel 211A is reversed from the counterclockwise direction to the clockwise direction. In the example of FIG. 4, the angle difference is divided into six sections. Twelve effect sounds are each stored in accordance with a combination of the angle difference and the rotation direction before the reversal.

The effect sounds FX1*a* to FX6*a* and FX1*b* to FX6*b* are different from each other in the parameter and the algorithm for generating the effect sound. The effect playback controller 46 refers to the effect storage unit 5, selects the effect sound, and generates the effect sound by processing a portion of the first music loaded in the player 2A on the basis of the parameter and the algorithm described above. It is to be noted that the portion of the first music serving as an original sound of the effect sound may be set to have, for example, a length that starts from a predesignated playback-start position of the first music and corresponds to the angle difference. The playback-start position may be designated by the user operation with use of, for example, the cue button 213A and the play/pause button 214A.

Processing of the effect sound is performed based on the parameter and the algorithm described above by a known method. Examples of such a method include playback or backward playback of a portion of the first music, adjustment of duration of playback, adjustment of a tone, and partial muting (including a pattern of muting). In processing the effect sound, the effect sound may be synchronized with a beat position of the second music being played back in the player 2B which is the player on the opposite side. The beat position is obtainable by analyzing second music data in advance based on an existing music analysis technique. Synchronizing the effect sound with the beat position makes it possible to further enhance a rendering effect of the scratch playback.

The effect sounds FX1*a* to FX6*a* and FX1*b* to FX6*b* are different from each other in the parameter and the algorithm for generating the effect sound. Thus, different effect sounds are to be generated depending on a position at which the user reverses the rotation direction of the jog wheel 211A and the rotation direction before the reversal. Further, the effect playback controller 46 generates the effect sound based on the original sound. Thus, a different effect sound is to be generated from a different original sound even if the user performs the same operation.

The example of FIG. 4 illustrates a case where the effect storage unit 5 stores 12 effect sounds has been described; however, the number of effect sounds stored in the effect storage unit 5 may be any as long as the number is one or more.

Further, the effect sound to be stored in the effect storage unit 5 may be settable by the user, or the effect storage unit 5 may store a preferable effect sound in advance. In addition, the user may change a portion or all of the effect sound that is stored in advance, and the changed effect sound may be stored.

Further, the effect playback controller 46 also plays back the effect sound at time t1 when the contact sensor 211$S_A$ of the jog wheel 211A detects contact, in addition to above-described time t3 when the rotation direction of the jog wheel 211A is reversed. The effect sound played back at the time point when the contact sensor 211$S_A$ of the jog wheel 211A detects the contact is referred to as an effect sound FX0. The effect sound FX0 is an effect sound suitable for a start of the scratch playback. The effect sound FX0 is immediately played back at a timing when the user touches the jog wheel 211A, and thus, the user is able to start the scratch playback at a timing desired by the user.

As described above, when the user touches the point P1 of the contact sensor 211$S_A$ of the jog wheel 211A of the player 2A while the playback of the second music is performed by the player 2B during the execution of the scratch mode, the effect sound FX0 is played back. Thereafter, if the user performs the rotating operation on the jog wheel 211A in the clockwise direction along the arrow A1, following which the user performs the rotating operation on the jog wheel 211A in the counterclockwise direction along the arrow A2, the scratch sound that is the effect sound is played back by the player 2A in addition to the second music played back by the player 2B. In other words, the user is able to perform the scratch playback by only performing a simple operation similar to an actual scratch operation of reversing the rotation direction on the jog wheel 211A. Further, the user is able to perform switching between various types of effect playback by changing the angle difference between the angle based on when the user newly touches the contact sensor 211$S_A$ of the jog wheel 211A and the angle based on when the rotating operation is reversed.

Next, referring to a flowchart in FIG. 5, a method of controlling playback of an audio device according to an exemplary embodiment of the invention will be described.

Figure 5:
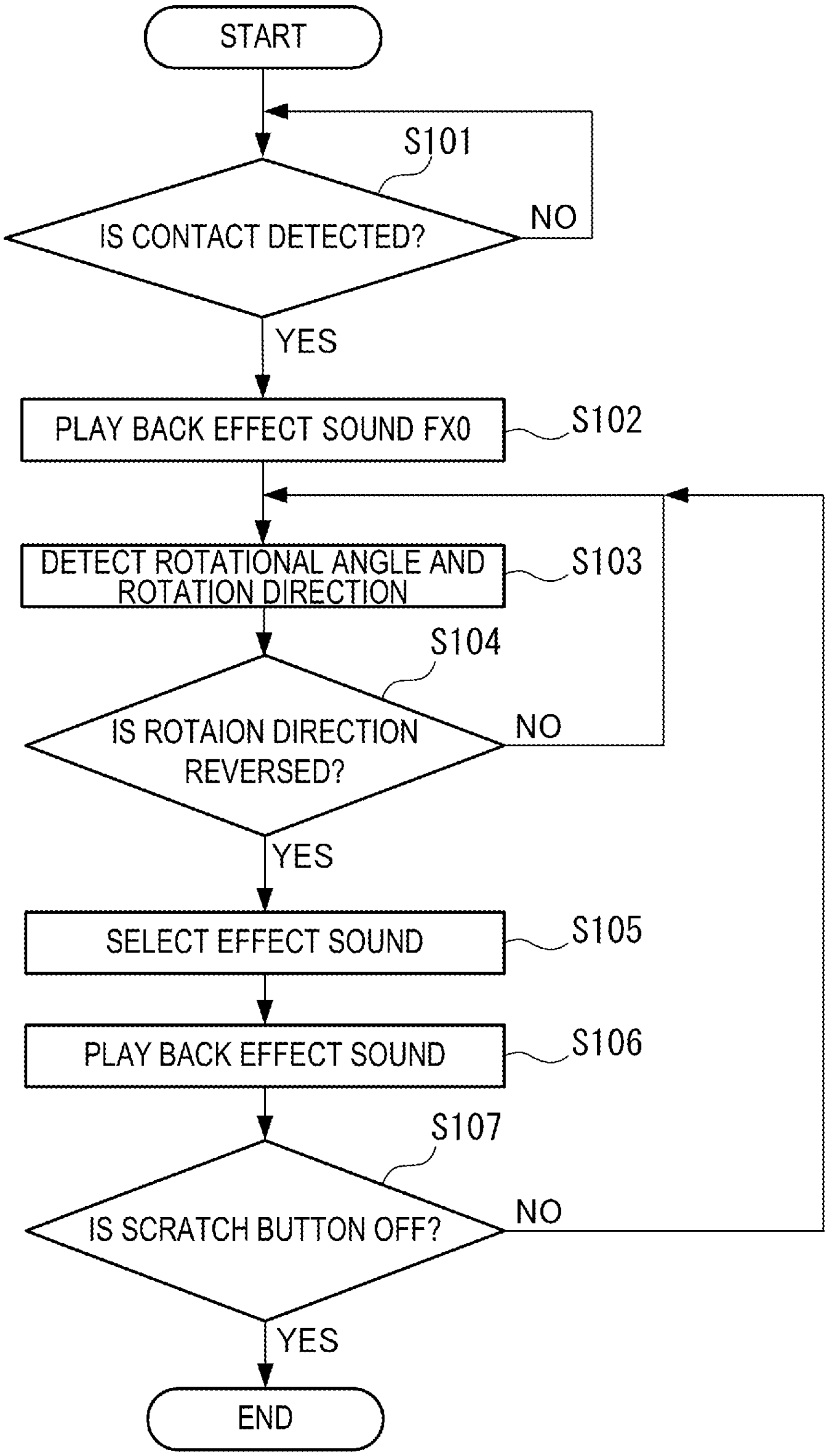
FIG. 5 is a flowchart illustrating a playback control method according to an exemplary embodiment of the invention.

FIG. 5 illustrates the flowchart of a process during the execution of the scratch mode. Hereinafter, a case will be described as an example where the scratch mode is executed by the player 2A while the player 2B is playing back the second music. First, if the detector 42 detects contact of the user on the contact sensor 211$S_A$ of the jog wheel 211A (Step S101: YES), the effect playback controller 46 plays back the effect sound F0 (Step S102).

Thereafter, the detector 42 detects the rotational angle and the rotation direction of the jog wheel 211A (Step S103), and the determination unit 43 determines whether the rotation direction of the jog wheel 211A has been reversed (Step S104). If the determination unit 43 determines that the rotation direction of the jog wheel 211A has not been reversed (Step S104: NO), the controller 4 returns to Step S103.

If the determination unit 43 determines that the rotation direction of the jog wheel 211A is reversed (Step S104: YES), the effect playback controller 46 refers to the effect storage unit 5 and selects the effect sound (Step S105), and plays back the effect sound (Step S106).

The controller 4 repeats the process from Steps S103 to S107 at a predetermined time interval until the user operation of turning off the scratch mode button 216A is received (Step S107: YES), to thereby execute the scratch mode.

It is to be noted that, in FIGS. 3 to 5, the case where the scratch mode is executed by the player 2A while the second music is being played back by the player 2B has been described as an example; however, a similar process is performed for a case where the scratch mode is executed by the player 2B while the first music is being played back by the player 2A. That is, in a case where the user operation of turning on the scratch mode button 216B is received while the first music is being played back in the player 2A, the player 2B executes the scratch mode in which the scratch sound that is the effect sound is added in an effect sound manner.

According to the exemplary embodiments of the invention described above, the rotational angle of the jog wheel 211A or 211B that is the rotary operation element is detected, and whether the rotation direction of the jog wheel 211A or 211B is reversed is determined. Thereafter, the effect sound is played back which is associated with the angle difference between: the rotational angle based on when the rotation direction of the jog wheel 211A or 211B is reversed; and the reference angle. This makes it possible to perform the scratch playback with a high performance effect by a simple operation similar to the actual scratch operation even by a user having little experience or knowledge, without necessitating a high-level skill.

Further, according to the exemplary embodiments of the invention described above, the reference angle is the rotational angle based on when the contact sensor 211$S_A$ of the jog wheel 211A or the contact sensor 211$S_B$ of the jog wheel 211B detects new contact. This makes it possible to perform the scratch playback with a high performance effect even if the user performs the operation roughly without being particularly conscious of the contact-start position on the jog wheel 211A or on the jog wheel 211B.

Further, according to the exemplary embodiments of the invention described above, the effect sound F0 is played back when the contact sensor 211$S_A$ of the jog wheel 211A or the contact sensor 211$S_B$ of the jog wheel 211B detects contact. This makes it possible to start the scratch playback at the timing desired by the user.

Further, according to the exemplary embodiments of the invention described above, different effect sounds are played back depending on the above-described angle difference and the rotation direction before the reversal. Thus, it is possible to easily and selectively use multiple effect sounds that are each associated with, in addition to the combination with the angle difference between the rotational angle and the reference angle, the rotation direction before the reversal. This makes it possible to achieve a variety of scratch playbacks without impairing enjoyment of playing.

It is to be noted that, in the exemplary embodiments described above, the example shows that the rotational angle based on when the contact sensor 211$S_A$ of the jog wheel 211A or the contact sensor 211$S_B$ of the jog wheel 211B detects new contact serves as the reference angle; however, another rotational angle may serve as the reference angle. Further, the reference angle may be designated by the user.

Further, the example has been described in the exemplary embodiments in which the effect sound F0 is played back when the contact sensor 211$S_A$ of the jog wheel 211A or the contact sensor 211$S_B$ of the jog wheel 211B detects contact. However, no effect sound F0 may be played back, or whether to play back the effect sound F0 may be designated by the user.

Further, the multiple effect sounds each associated with the angle difference and the rotation direction before the reversal described in the above exemplary embodiments are merely examples, and are not limited to those in this example. In the exemplary embodiments described above, the example has been described in which the angle difference is divided into six sections; however, the number of sections into which the angle difference is to be divided is not limited thereto. Further, the effect sound may be associated with only one of the angle difference and the rotation direction before the reversal.

Further, the example has been described in the exemplary embodiments in which the scratch sound is played back in synchronization with the beat position of the music being played back in the player on the opposite side; however, the playback may be performed without synchronization. Further, the scratch sound may be played back in synchronization with the beat position of the music being played back in the player executing the scratch mode.

Further, the audio device having the above-described functions is not limited to the DJ system described above in the exemplary embodiments, and may be, for example, a mixer or a DJ controller having a function of a mixer.

In the examples described above, a two-channel audio device having two players 2A and 2B has been described; however, an audio device having three or more channels, for example, is also able to achieve a similar function. It is to be noted that, for the audio device having three or more channels to achieve the similar function, it is preferable that the scratch mode be executed exclusively. For example, in a case of achieving the similar function by the audio device having four channels, it is preferable that the scratch mode be executable only by a portion of the audio device to avoid simultaneous use of the scratch mode. Further, in a case of achieving the similar function by the audio device having three or more channels, the scratch sound may be played back in synchronization with a beat position of music being played back in a master player.

Further, the invention is not limited to the DJ device, and is also applicable to an audio device such as a common mixer or electronic musical instrument.

Preferred exemplary embodiments of the invention have been described above in detail with reference to the accompanying drawings, but the invention is not limited to such exemplary embodiments. It is apparent that a person having ordinary skill in the art of the invention can arrive at various alterations and modifications within the scope of the technical idea recited in the appended claims, and it is understood that such alterations and modifications naturally fall within the technical scope of the invention.

The invention claimed is:

1. An audio device comprising:

a detector configured to detect a rotational angle of a rotary operation element;

a determination unit configured to determine, based on the rotational angle, whether a rotation direction of the rotary operation element is reversed; and an effect playback controller configured to play back an effect sound associated with an angle difference between the rotational angle based on when the rotation direction is reversed and a reference angle.

2. The audio device according to claim 1, wherein the rotary operation element has an operation surface provided with a contact sensor, and the reference angle is the rotational angle based on when the contact sensor detects new contact.

3. The audio device according to claim 2, wherein the effect playback controller plays back the effect sound when the contact sensor detects contact.

4. The audio device according to claim 1, wherein the determination unit further determines a rotation direction before reversal of the rotary operation element, and the effect playback controller plays back a different effect sound depending on the angle difference and the rotation direction before the reversal.

5. The audio device according to claim 1, wherein the effect sound comprises a scratch sound based on forward playback or backward playback of first music.

6. The audio device according to claim 5, further comprising a music playback controller configured to play back second music that is different from the first music, wherein the effect playback controller causes the scratch sound to be played back in synchronization with a beat position of the second music.

7. A method of controlling playback of an audio device, the method comprising:

detecting a rotational angle of a rotary operation element;

determining, based on the rotational angle, whether a rotation direction of the rotary operation element is reversed; and playing back an effect sound associated with an angle difference between the rotational angle based on when the rotation direction is reversed and a reference angle.

8. A non-transitory computer-readable storage medium storing a program causing a computer to operate as an audio device, the audio device comprising:

a detector configured to detect a rotational angle of a rotary operation element;

a determination unit configured to determine, based on the rotational angle, whether a rotation direction of the rotary operation element is reversed; and an effect playback controller configured to play back an effect sound associated with an angle difference between the rotational angle based on when the rotation direction is reversed and a reference angle.

* * * * *